United States Patent [19]

Hiraiwa

[11] Patent Number: 4,802,385
[45] Date of Patent: Feb. 7, 1989

[54] AUTOMATIC TRANSMISSION'S RAVIGNEAUX TYPE PLANETARY GEAR TRAIN HAVING TWO RING GEARS

[75] Inventor: Kazuyoshi Hiraiwa, Hamamatsu, Japan

[73] Assignee: Nissan Motor Co., Ltd., Yokohama, Japan

[21] Appl. No.: 917,896

[22] Filed: Oct. 10, 1986

[30] Foreign Application Priority Data

Oct. 11, 1985 [JP] Japan ................. 60-224780

[51] Int. Cl.$^4$ ............................. F16H 57/10
[52] U.S. Cl. ........................ 74/758; 74/759
[58] Field of Search ................... 74/758, 759

[56] References Cited

U.S. PATENT DOCUMENTS

| | | | |
|---|---|---|---|
| 2,220,174 | 11/1940 | Ravigneaux | 74/759 X |
| 2,631,476 | 3/1953 | Ravigneaux | 74/759 |
| 2,761,333 | 9/1956 | Ravigneaux | 74/759 |
| 2,847,877 | 8/1958 | Ravigneaux | 74/759 |
| 3,299,746 | 1/1967 | Konrad | 74/759 X |
| 3,853,023 | 12/1974 | Mori et al. | 74/759 |
| 3,979,974 | 9/1976 | Murakami | 74/759 |
| 4,417,484 | 11/1983 | Gaus et al. | 74/759 X |
| 4,638,688 | 1/1987 | Hiraiwa | 74/763 |
| 4,653,347 | 3/1987 | Hiraiwa | 74/759 |
| 4,653,348 | 3/1987 | Hiraiwa | 74/759 |
| 4,660,439 | 4/1987 | Hiraiwa | 74/763 |

FOREIGN PATENT DOCUMENTS 0915640 6/1954 Fed. Rep. of Germany ........ 74/858

OTHER PUBLICATIONS

Shinpen Jidoshakogaku Binran, Society of Automotive Engineers of Japan, vol. 5, pp. 1-19.

Primary Examiner—Dirk Wright
Attorney, Agent, or Firm—Foley & Lardner, Schwartz, Jeffery, Schwaab, Mack, Blumenthal & Evans

[57] ABSTRACT

A planetary gear train having first and second pinion gears supported on a single pinion carrier, first and second sun gears meshing, respectively, with the first and second pinions, and a first ring gear meshing with the first pinions is further provided with a second ring gear which is in mesh with the second pinions, and a brake for holding the second ring gear, in order to provide five forward speeds.

10 Claims, 3 Drawing Sheets

FIG.3

$$\alpha_1 = \frac{Z_{S1} \times Z_{P2}}{Z_{R2} \times Z_{P1}}$$

$$\alpha_2 = \frac{Z_{S2}}{Z_{R2}}$$

$$\alpha_3 = \frac{Z_{S2}}{Z_{R1}}$$

$\alpha_1 = 0.27$
$\alpha_2 = 0.31$
$\alpha_3 = 0.28$

| | | C1 | C2 | C3 | B1 | B2 | B3 | B4 | OWC1 | OWC2 | OWC3 | RATIO | |
|---|---|---|---|---|---|---|---|---|---|---|---|---|---|
| D | 1 | | ○ | | | | | | | ○ | | $1/\alpha_2$ | 3.226 |
| D | 2 | | ○ | | | | ○ | | | | ○ | $(1+\alpha_3)/(\alpha_2+\alpha_3)$ | 2.169 |
| D | 3 | | ○ | | ○ | | | | | | ○ | $(\alpha_1+\alpha_2)/\alpha_2(1+\alpha_1)$ | 1.473 |
| D | 4 | ○ | | | (○) | | | | ○ | | | 1 | 1.000 |
| D | 5 | | | ○ | ○ | | | | | | | $1/(1+\alpha_1)$ | 0.787 |
| R | | | | ○ | | ○ | | | | | | $-1/\alpha_1$ | −3.704 |
| L | 1 | | | | | | | ○ | | | | | |
| L | 2 | | ○ | | | ○ | | ○ | | | | | |
| L | 3 | | ○ | | ○ | | ○ | ○ | | | | | |
| L | 4 | | ○ | ○ | | | | ○ | | | | | |

AUTOMATIC TRANSMISSION'S RAVIGNEAUX TYPE PLANETARY GEAR TRAIN HAVING TWO RING GEARS

BACKGROUND OF THE INVENTION

The present invention relates to a plenatary gear train for an automatic transmission, and more specifically to a planetary gear train having pinion gears of two different kinds having different numbers of teeth, supported on a common pinion carrier.

Conventional examples of the planetary gear train of such a type are shown in 'Shinpen Jidōshakōgaku Binran', (published by Society of Automative Engineers of Japan), Vol. 5, page 1-19, FIG. 1-46 (three speed type) and page 1-21, FIG. 1-53 (four speed type). However, these planetary gear trains cannot provide five forward speeds.

SUMMARY OF THE INVENTION

It is an object of the present invention to provide a planetary gear system for providing five forward speeds.

According to the present invention, the planetary gear system comprises a stationary member such as a transmission case, input means for receiving a driving torque, an output shaft, a compound planetary gear train, a clutch group, and a holding device group. The compound planetary gear train comprises a plurality of pinion sets each of which consists of a first pinion ($P_1$) and a second pinion ($P_2$) meshing with each other, a pinion carrier (PC) rotatably supporting the first and second pinion, a first sun gear ($S_1$) meshing with the first pinion, a second sun gear ($S_2$) meshing with the second pinions, a first ring gear ($R_1$) which is in mesh with the first pinions and always connected with the output shaft, and a second ring gear ($R_2$) meshing with the second pinions. The clutch group includes a first clutch ($C_1$) disposed between the input means and the first sun gear for connection and disconnection between the input means and the first sun gear, a second clutch ($C_2$) disposed between the input means and the second sun gear for connection and disconnection between the input means and the second sun gear, and a third clutch ($C_3$) disposed between the input means and the pinion carrier for connection and disconnection between the input means and the pinion carrier. The holding device group includes a first holding device ($B_1$) disposed between the first sun gear and the stationary member for holding the first sun gear, a second holding device ($B_2$) disposed between the pinion carrier and the stationary member for holding the pinion carrier, and a third brake holding device ($B_3$) disposed between the second ring gear and the stationary member for holding the second ring gear.

The thus-constructed planetary gear system of the present invention can provide five forward speeds with the clutches and holding device being actuated in the manner shown in FIG. 3. In this gear system, the second speed is obtained additionally, as compared with the conventional gear train, by providing the second ring gear.

It is optional to form the first pinions into a shape having two sections so that the number of teeth of one section is not equal to that of the other section. In this case, the gear system can provide more desirable gear ratios. Furthermore, it is possible to facilitate the adjustment of shift timing by adding one or more one-way clutches.

BRIEF DESCRIPTION OF THE DRAWINGS

FIG. 3 is a chart showing the clutch and brake engagement-and-release pattern.

DETAILED DESCRIPTION OF THE INVENTION

Figure 1:
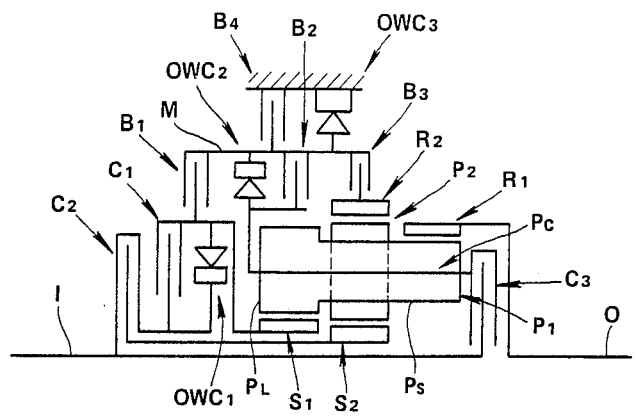
FIG. 1 is a schematic view of a planetary gear system for showing a first embodiment of the present invention.
Figure 2:
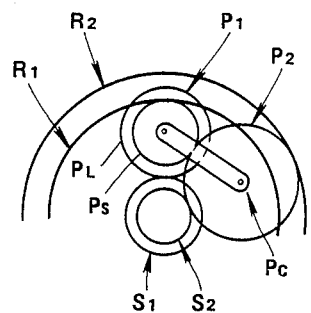
FIG. 2 is a view showing a planetary gear train of FIG. 1.

A FIRST EMBODIMENT of the present invention is shown in FIGS. 1-3. A planetary gear system of the first embodiment has a compound planetary gear train including a plurality of pinion pairs each of which consists of a first pinion $P_1$ and a second pinion $P_2$, a pinion carrier PC supporting the first and second pinions $P_1$ and $P_2$ rotatably, first and second sun gears $S_1$ and $S_2$, and first and second ring (or internal) gears $R_1$ and $R_2$. The gear system further includes an input shaft I, an output shaft O, first, second and third clutches $C_1$, $C_2$ and $C_3$, first, second, third and fourth holding devices $B_1$, $B_2$, $B_3$ and $B_4$, and first, second and third coupling device in the form of one-way clutches $OWC_1$ and $OWC_2$ and one way brake $OWC_3$.

The first pinions $P_1$ are in mesh with both the first sun gear $S_1$ and the first ring gear $R_1$. The second pinions $P_2$ are in mesh with both the second sun gear $S_2$ and the second ring gear $R_2$. Each of the first pinions $P_1$ of this embodiment has a large diameter gear section $P_L$ and a small diameter gear section Ps. The large gear section $P_L$ or each first pinion is in mesh with the first sun gear $S_1$, and the small gear section Ps is in mesh with the first ring gear $R_1$, as shown in FIGS. 1 and 2.

In each pinion pair, the second pinion $P_2$ is in mesh with the small gear section Ps of the first pinion $P_1$. In each first pinion $P_1$, the number of teeth of the large gear section $P_L$ is greater than the number of teeth of the small gear section Ps. In this embodiment, as shown in FIGS. 1 and 2, the number of teeth of each second pinion $P_2$ is greater than the number of teeth of the large gear section $P_L$ of each first pinion $P_1$. The number of teeth of the second ring gear $R_2$ is greater than the number of teeth of the first ring gear $R_1$, as shown in FIGS. 1 and 2. The number of teeth of the first sun gear $S_1$ is greater than the number of teeth of the second sun gear $S_2$, as shown in FIGS. 1 and 2. As shown in FIG. 1, the second ring gear $R_2$, the second pinions $P_2$ and the second sun gear $S_2$ are placed axially between the first sun gear $S_1$ and the first ring gear $R_1$.

The first sun gear $S_1$, the second sun gear $S_2$ and the pinion carrier PC can be connected with the input shaft I through the first, second and third clutches $C_1$, $C_2$ and $C_3$, respectively. The first sun gear $S_1$ can be connected with an intermediate member M through the first holding device $B_1$. The pinion carrier PC can be connected with the intermediate member M through the second holding device $B_2$. The second ring gear $R_2$ can be connected with the intermediate member M through the third holding device $B_3$. The first ring gear $R_1$ is always connected with the output shaft O. The first one-way clutch $OWC_1$ is disposed between the input shaft I and the first sun gear $S_1$ in parallel to the first clutch $C_1$. The second one-way clutch $OWC_2$ is disposed in parallel to the second brake $B_2$. The intermediate member M can be fixed to a stationary member through the fourth holding device $B_4$ and the one-way brake $OWC_3$ which are arranged in parallel to each other.

In this gear system, five forward speeds and one reverse speed can be obtained by actuating one or more elements selected among the clutches $C_1$, $C_2$ and $C_3$, the holding devices $B_1$, $B_2$, $B_3$ and $B_4$, the one-way clutches $OWC_1$ and $OWC_2$ and one way brake $OWC_3$ in various combinations listed in FIG. 3. In the table of FIG. 3, each of circles denotes an actuating element, and a circle in parenthesis denotes an element which is acting without taking part in transmitting the driving torque. This gear system can provide a set of gear ratios which is suitable for a five speed transmission. For example, the gear ratios listed in FIG. 3 can be obtained when $\alpha_1=0.27$, $\alpha_2=0.31$ and $\alpha_3=0.28$ where $\alpha_1=(Z_{S1}\times Z_{P2})/(Z_{R2}\times Z_{P1})$, $\alpha_2=Z_{S2}/Z_{R2}$, $\alpha_3=Z_{S2}/Z_{R1}$, and Z is the number of teeth. In this gear system, the adjustment of shift timing is easy because it is not necessary to change over two or more of the clutches and brakes simultaneously except the shift from second speed to fifth speed or other shift skipping two or more intervening speeds.

Figure 4:
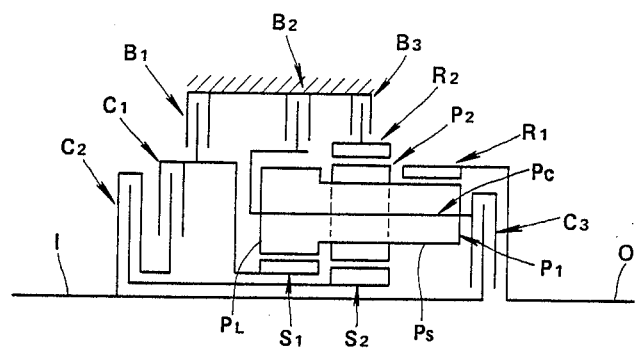
FIG. 4 is a schematic view similar to FIG. 1 but showing a second embodiment of the present invention.

A SECOND EMBODIMENT of the present invention is shown in FIG. 4. The first embodiment shown in FIG. 1 employs the one-way clutches $OWC_1$ and $OWC_2$, one way brake $OWC_3$, and the fourth holding device $B_4$ in order to facilitate adjustment of shift timing. These elements are omitted in the second embodiment. In the second embodiment, all of the elements $OWC_1$, $OWC_2$ and $OWC_3$ and the $B_4$ are omitted. However, it is optional to add any one or more of the four elements $OWC_1$, $OWC_2$, $OWC_3$ and $B_4$ to the system of FIG. 4.

Figure 5:
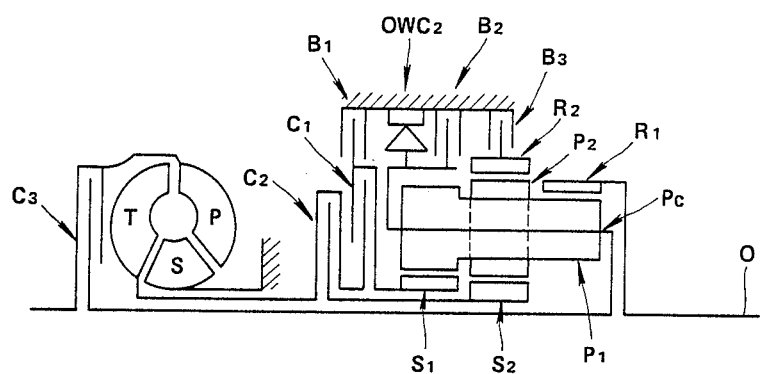
FIG. 5 is a schematic view similar to FIGS. 1 and 4, but showing a third embodiment.

A THIRD EMBODIMENT of the present invention is shown in FIG. 5. In the third embodiment, the third clutch $C_3$ is used as a lock-up clutch for a torque converter (or a fluid coupling). The torque converter of FIG. 5 has a pump impeller P, a turbine T and a stator S. In this case, the first, second and third speeds can be obtained in the same manner as in the first embodiment. In the fourth speed, the driving torque is transmitted along two parallel torque paths. In the fifth speed, all of the driving torque is transmitted through the mechanical drive provided by the clutch $C_3$ (lock-up state).

The first, second and third embodiments employ the first pinion $P_1$ having the small diameter gear section $P_S$ and the large diameter gear section $P_L$. However, it is optional to use the first pinion $P_1$ of a uniform cylindrical shape.

In this way, the present invention can provide a planetary gear system for a five speed automatic transmission by providing a Ravigneaux type planetary gear train with another ring gear which can be held to the stationary member.

What is claimed is:
1. A planetary gear system comprising:
a stationary member,
input means for receiving a driving torque,
an output shaft,
a compound planetary gear train comprising a plurality of pinion sets each comprising a first pinion and a second pinion meshing with each other, a pinion carrier supporting said first and second pinions, a first sun gear meshing with said first pinions, a first ring gear meshing with said first pinions and always connected with said output shaft, a second sun gear meshing with said second pinions, and a second ring gear meshing with said second pinions,
a clutch group including a first clutch disposed between said input means and said first sun gear for connection and disconnection therebetween, a second clutch disposed between said input means and said second sun gear for connection and disconnection therebetween, and a third clutch disposed between said input means and said pinion carrier for connection and disconnection therebetween, and
a holding device group including a first holding device disposed between said first sun gear and said stationary member for holding said first sun gear, a second holding device disposed between said pinion carrier and said stationary member for holding said pinion carrier, and a third holding device disposed between said second ring gear and said stationary member for holding said second ring gear,
wherein each of said first pinions has a large gear section having a diameter and a small gear section which rotates with said large gear section as a unit and which has a diameter smaller than said diameter of said large gear section, said large gear section of each of said first pinions being in mesh with said first sun gear, and said small gear section of each of said first pinions being in mesh with said first ring gear, and wherein, in each pinion set, said second pinion is in mesh with said small gear section of said first pinion.

2. A planetary gear system according to claim 1 further comprising a first one-way coupling device disposed between said input means and said first sun gear in parallel to said first clutch.

3. A planetary gear system according to claim 2 further comprising a second one-way coupling device disposed between said pinion carrier and said stationary member in parallel to said second holding device.

4. A planetary gear system according to claim 1 wherein said input means comprises a first member and a second member which is adapted to be driven by said first member through a hydrodynamic drive, said third clutch being disposed between said first member of said input means and said pinion carrier, said first clutch being disposed between said second member of said input means and said first sun gear, and said second clutch being disposed between said second member of said input means and said second sun gear.

5. A planetary gear system according to claim 4 further comprising a one-way coupling device disposed between said pinion carrier and said stationary member in parallel to said second holding device.

6. A planetary gear system according to claim 1 further comprising a one-way coupling device disposed between said input means and said first sun gear in parallel to said first clutch.

7. A planetary gear system according to claim 1 further comprising a one-way coupling device disposed between said pinion carrier and said stationary member in parallel to said second holding device.

8. A planetary gear system comprising
a stationary member,
input means for receiving a driving torque,
an output shaft, a compound planetary gear train comprising a plurality of pinion sets each consisting of a first pinion and a second pinion meshing with each other, a pinion carrier supporting said first and second pinions, a first sun gear meshing with said first pinions, a first ring gear meshing with said first pinion and always connected with said output shaft, a second sun gear meshing with said second pinions, and a second ring gear meshing with said second pinions, a clutch group including a first clutch disposed between said input means and said first sun gear for connection and disconnection therebetween, a second clutch disposed between said input means and said second sun gear for connection and disconnection therebetween, and a third clutch disposed between said input means and said pinion carrier for connection and disconnection therebetween, and a brake group including a first brake disposed between said first sun gear and said stationary member for holding said first sun gear, a second brake disposed between said pinion carrier and said stationary member for holding said pinion carrier, and a third brake disposed between said second ring gear and said stationary member for holding said second ring gear, wherein said gear system further comprises a third one-way clutch and a fourth brake which are disposed in parallel to each other between said stationary member and an intermediate member, said first, second and third brakes being connected to said stationary member through said intermediate member and the parallel combination of said third one-way clutch and said fourth brake.

9. A planetary gear system according to claim 8 wherein said input means consists of an input shaft.

10. A planetary gear system comprising
a stationary member,
input means for receiving a driving torque,
an output shaft, a compound planetary gear train comprising a plurality of pinion sets each consisting of a first pinion and a second pinion meshing with each other, a pinion carrier supporting said first and second pinions, a first sun gear meshing with said first pinions, a first ring gear meshing with said first pinion and always connected with said output shaft, a second sun gear meshing with said second pinions, and a second ring gear meshing with said second pinions, a clutch group including a first clutch disposed between said input means and said first sun gear for connection and disconnection therebetween, a second clutch disposed between said input means and said second sun gear for connection and disconnection therebetween, and a third clutch disposed between said input means and said pinion carrier for connection and disconnection therebetween, and a brake group including a first brake disposed between said first sun gear and said stationary member for holding said first sun gear, a second brake disposed between said pinion carrier and said stationary member for holding said pinion carrier, and a third brake disposed between said second ring gear and said stationary member for holding said second ring gear, wherein said gear system further comprises a one-way clutch and a fourth brake which are disposed in parallel to each other between said stationary member and an intermediate member, said first brake being disposed between said first sun gear and said intermediate member, said second brake being disposed between, said pinion carrier and said intermediate member, said third brake being disposed between said second ring gear and said intermediate member.

* * * * *